United States Patent
Rabin et al.

(10) Patent No.: US 7,287,159 B2
(45) Date of Patent: Oct. 23, 2007

(54) DETECTION AND IDENTIFICATION METHODS FOR SOFTWARE

(75) Inventors: Michael O. Rabin, Cambridge, MA (US); Dennis E. Shasha, New York, NY (US); Carleton J. Bosley, New York, NY (US); Ramon Caceres, New York, NY (US); Aaron Ingram, New York, NY (US); Timir Karia, New York, NY (US); David Molnar, Berkeley, CA (US); Yossi Beinart, New York, NY (US)

(73) Assignee: ShieldIP, Inc., New York, NY (US)

( * ) Notice: Subject to any disclaimer, the term of this patent is extended or adjusted under 35 U.S.C. 154(b) by 0 days.

(21) Appl. No.: 10/815,985

(22) Filed: Apr. 1, 2004

(65) Prior Publication Data

US 2005/0228989 A1    Oct. 13, 2005

(51) Int. Cl.
  *H04L 9/00* (2006.01)
  *G06F 9/44* (2006.01)
  *G06F 13/00* (2006.01)
(52) U.S. Cl. .................. 713/161; 717/126; 713/173; 713/176
(58) Field of Classification Search .............. None
  See application file for complete search history.

(56) References Cited

U.S. PATENT DOCUMENTS 3,609,697 A    9/1971   Blevins et al.
3,996,449 A    12/1976  Attanasio et al.
4,458,315 A    7/1984   Uchenick
4,658,093 A    4/1987   Hellman
4,866,769 A    9/1989   Karp
5,023,907 A    6/1991   Johnson et al.
5,109,413 A    4/1992   Comerford et al.
5,132,992 A *  7/1992   Yurt et al. ............... 375/240
5,375,206 A    12/1994  Hunter et al.
5,483,658 A *  1/1996   Grube et al. ............. 726/29

(Continued)

FOREIGN PATENT DOCUMENTS

JP    411136618 A    5/1999

(Continued)

OTHER PUBLICATIONS

Collberg, Christian. Thomborson, Clark. "Software Watermarking: Models and Dynamic Embeddings". 1999. Annual Symposium on Principles of Programming Languages. Proceedings of the 26th ACM SIGPLAN-SIGACT symposium on Principles of programming languages. pp. 311-324. Found of the World Wide Web at: http://doi.acm.org/10.1145/292540.292569.*

(Continued)

*Primary Examiner*—Ayaz Sheikh
*Assistant Examiner*—Jeremiah Avery
(74) *Attorney, Agent, or Firm*—Hamilton, Brook, Smith & Reynolds, P.C.

(57) ABSTRACT

Software is identified while in main memory by examining small portions of its executable image or by examining the results of its execution. These portions, or an encoding of them, are then compared with previously stored identifying information about at least one Software through an approximate matching process.

50 Claims, 10 Drawing Sheets

U.S. PATENT DOCUMENTS

| | | | |
|---|---|---|---|
| 5,598,470 A | | 1/1997 | Cooper et al. |
| 5,606,663 A | | 2/1997 | Kadooka |
| 5,613,004 A | | 3/1997 | Cooperman et al. |
| 5,646,997 A | * | 7/1997 | Barton ................. 713/176 |
| 5,719,941 A | | 2/1998 | Swift et al. |
| 5,724,425 A | | 3/1998 | Chang et al. |
| 5,745,569 A | | 4/1998 | Moskowitz et al. |
| 5,748,740 A | | 5/1998 | Curry et al. |
| 5,761,651 A | | 6/1998 | Hasebe et al. |
| 5,825,883 A | | 10/1998 | Archibald et al. |
| 5,872,844 A | | 2/1999 | Yacobi |
| 5,892,900 A | | 4/1999 | Ginter et al. |
| 5,910,987 A | | 6/1999 | Ginter et al. |
| 5,915,019 A | | 6/1999 | Ginter et al. |
| 5,917,912 A | | 6/1999 | Ginter et al. |
| 5,920,861 A | | 7/1999 | Hall et al. |
| 5,922,208 A | | 7/1999 | Demmers |
| 5,924,094 A | | 7/1999 | Sutter |
| 5,926,624 A | * | 7/1999 | Katz et al. .............. 709/217 |
| 5,933,498 A | * | 8/1999 | Schneck et al. ........... 705/54 |
| 5,943,422 A | | 8/1999 | Van Wie et al. |
| 6,052,780 A | | 4/2000 | Glover |
| 6,115,802 A | | 9/2000 | Tock et al. |
| 6,122,403 A | * | 9/2000 | Rhoads ................. 382/233 |
| 6,134,327 A | | 10/2000 | Van Oorschot |
| 6,165,072 A | * | 12/2000 | Davis et al. .............. 463/29 |
| 6,170,058 B1 | | 1/2001 | Kausik |
| 6,170,060 B1 | * | 1/2001 | Mott et al. ............... 726/29 |
| 6,237,095 B1 | | 5/2001 | Curry et al. |
| 6,240,184 B1 | | 5/2001 | Huynh et al. |
| 6,341,352 B1 | | 1/2002 | Child et al. |
| 6,553,413 B1 | * | 4/2003 | Leighton et al. .......... 709/219 |
| 6,691,229 B1 | | 2/2004 | Nelson |
| 6,697,948 B1 | | 2/2004 | Rabin et al. |
| 6,889,209 B1 | | 5/2005 | Rabin et al. |
| 6,889,325 B1 | | 5/2005 | Sipman et al. |
| 6,920,436 B2 | | 7/2005 | Stefik et al. |
| 6,920,567 B1 | | 7/2005 | Doherty et al. |
| 6,948,070 B1 | | 9/2005 | Ginter et al. |
| 6,963,859 B2 | | 11/2005 | Stefik et al. |
| 7,043,636 B2 | * | 5/2006 | Smeets ................. 713/170 |
| 7,110,982 B2 | | 9/2006 | Feldman et al. |
| 2002/0144115 A1 | | 10/2002 | Lemay et al. |
| 2003/0191942 A1 | | 10/2003 | Sinha et al. |
| 2005/0010475 A1 | | 1/2005 | Perkowski et al. |

FOREIGN PATENT DOCUMENTS

| | | |
|---|---|---|
| WO | WO98/45768 | 10/1998 |
| WO | WO 02054341 A1 * | 7/2002 |

OTHER PUBLICATIONS

Esparza, Oscar. Fernandez, Marcel. Soriano, Miguel. "Protecting mobile agents by using traceability techniques". 2003. Information Technology: Research and Education 2003 proceeding. ITRE2003 International Conference. pp. 264-268. Found on the World Wide Web at: http://ieeexplore.ieee.org/iel5/8953/28360/01270618.pdf?tp=&arnumber=1270618&isnumb.*

Digimarc: Digimarc Watermarking Technology Receives U.S. Patent, *Business Wire*, File 810, Jun. 11, 1997.

Kaplan, Mark A., "IBM Cryptolopes™, Super Distribution and Digital Rights Management," http://www.research.ibm.com/peop...plan/cryptolope-docs/crypap,html, 7 pages (1996).

* cited by examiner

LET GROUP G CONSIST OF SOFTWARES Si, ...,Sk. FOR EACH SOFTWARE Si IN G, COMPUTE A SET OF FINGERPRINTS FOR EACH OF SEVERAL EXECUTIONS OF THE SOFTWARE Si. CALL THE RESULT AllSets(Si). FIND ALL FINGERPRINTS THAT ARE IN EVERY SET IN AllSets(Si). CALL THESE CandidateFinger(Si). FIND THE FINGERPRINTS THAT ARE IN ANY SET OF AllSets(Si). CALL THEM AllFinger(Si).
601

FIND THOSE FINGERPRINTS IN CandidateFinger(Si) THAT ARE ABSENT FROM AllFinger(Sj) FOR ALL j UNEQUAL TO i. THAT RESULT IS CALLED InGroup GoldenFinger(Si, G)
603

InGroupSuperFingerprint(Si, G) IS A SUBSET OF InGroupGoldenFinger(Si, G).
604

FIG. 6

DETECTION AND IDENTIFICATION METHODS FOR SOFTWARE

BACKGROUND OF THE INVENTION

For many purposes, including virus detection, digital rights protection, and asset management, it is essential to be able to identify software. Software will herein be construed in a wide sense including but not limited to any digital content such as computer code, Java applets, digitized music, digitized images and video, or digitized text and data. Identifying software may mean identifying the general Software group, e.g. Microsoft Word, or the particular version, e.g. Microsoft Word 11.2. Software to be identified may also be a subfunction of a larger Software, for example the spell-checker function of Microsoft Word.

There are many methods of identification such as by the filename as represented in the operating system of the computer, by internal strings in the Software, and by the size of the file on disk. Such methods however fail to work if the Software is changed at all, either for the purposes of deception or innocently. Further, these methods may fail to work if the Software is loaded from a remote computer as is the case for Java applets or the Software takes a different form when stored in the main memory of the computer than when stored on disk.

SUMMARY OF THE INVENTION

For these reasons, there exists a need to identify software reliably. Reliable identification sometimes requires that the Software be identified while in main memory by examining small portions of its executable image or by examining the results of its execution. These portions, or an encoding of them, are then compared with previously stored identifying information about at least one Software through an approximate matching process.

In accordance with the invention, a method for creating a superfingerprint for identifying a software is presented. The software is executed at least once. In each execution, specified portions of at least one of the executing software and of results of executing the software are selected and computations are performed on the selected portions to obtain a collection of fingerprints. The collections of fingerprints found in each execution are combined into the superfingerprint of the software according to a combining rule.

The software may be executed a plurality of times and the collection of fingerprints obtained during each execution are combined together according to the combining rule. The combining rule may output only those fingerprints that are computed in more than a specified number of executions. The combining rule may remove from the output those fingerprints that occur in more than a specified number of executions of specified other softwares. The fingerprints may not removed if they belong to a same group of software as the software.

A fingerprint may belong to the superfingerprints of several softwares. The several softwares may belong to a group of software. At least one fingerprint is stored in at least one data structure, and means to identify the several softwares in whose superfingerprint the fingerprint is included is also stored in the data structure. In one embodiment, the means to identify is a bit vector data structure whose mth bit indicates whether the superfingerprint associated with the mth member of the several softwares includes the fingerprint. In another embodiment, there are at least two numbers k1 and k2 associated with each fingerprint, where k2 is greater than or equal to k1, that indicate that the superfingerprints of softwares from k1 to k2 of the several softwares all include the fingerprint.

The fingerprints of various softwares may be stored in a data structure to facilitate and accelerate retrieval of fingerprints and associated names of software. In one embodiment, the executing software is partitioned into pages, the specified portions are selected from the pages and the computations produce a fingerprint for each portion. In other embodiments, the specified portions may be selected from the software stored in a memory of the device executing the software or from the software stored in secondary memory of the device executing the software. The specified portions may be basic blocks of programs.

The computations may involve only parts of the selected portions. The involved parts may be operation codes, information in an audio signal, or information in a visual display. The selected portion may concern the interaction between at least one user and the execution of software. The input to the computation may be a sequence. In one embodiment, the computation is a hash function value of the portion that may be computed by polynomial fingerprinting. In other embodiments, the computation is performed on an audio signal or a video stream.

The invention also provides a method for identifying a first software. Previously created superfingerprints for at least one software are stored. The first software is executed at least once. Specified portions of at least one of the executing software and of the results of executing the software on each execution are selected. Specified computations are performed on the selected portions to obtain a collection of fingerprints. The collection of fingerprints are compared to the previously computed superfingerprint of at least one second software to determine whether there is an approximate match. If an approximate match is found, the first software is declared to be the same as the second software.

The specified portions of the executing software and of the results of executing the software, may be stored in a memory of a device executing the software. In one embodiment, the specified portions of at-least one of the executing software and of the results of executing the software, are selected from recently accessed portions of the software stored in the memory of the device executing the software. In another embodiment, the specified components of the executing software are selected from portions of the executing software stored in secondary storage. The portions of the executing software may be selected while the software is sent from one device to another or from the output of the device executing the software. The specified portions of at least one of the executing software and of the results of executing the software on a later execution may be dependent on the results of an earlier approximate match.

The approximate match may be determined by determining whether the amount of the commonality between the fingerprints of the first software and the fingerprints comprising the superfingerprint of the at least one second software exceeds a specified threshold in which case the first software is identified to be the same as the second software. The specified threshold is exceeded only if the amount of commonality between the fingerprints of the first software and the fingerprints comprising the superfingerprint of the second software exceed the commonality between the fingerprints of the first software and the fingerprints comprising the superfingerprint of a third software. The commonality between the fingerprints of the first software and the second software depends on the number of fingerprints that are the same in the two softwares with a weighting factor for each equal fingerprint. The commonality may also depend on the number of fingerprints that are different in the two softwares with a weighting factor for each unequal fingerprint or on the relative positions of the portions of Software from which at least two fingerprints are computed. The specified computation may involve only parts of the selected portions, such as operation codes, information in an audio signal or information in a visual display.

The selected portion may concern the interaction between at least one user and the execution of software. The input to the computation may be a sequence. The input to the comparison may be a collection of fingerprints each having an associated weight. In one embodiment, the computation is a hash function value of the portion and the hash function may be computed by polynomial fingerprinting. The computation may be a computation on an audio signal or a video stream.

The invention also provides a method for identifying a software group of a first software. The previously created superfingerprints for at least one software group are stored. The first software is executed at least once. Specified portions of the executing first software and of the results of executing the first software on each execution are selected and specified computations are performed on the selected portions to obtain a collection of fingerprints. The collection of fingerprints are compared to the previously computed superfingerprint of at least one second software group to determine whether there is an approximate match and the first software is declared to be a member of the second software group if an approximate match is found.

The invention also provides a method for identifying a software that is a member of a group of software. Previously created superfingerprints for at least one software group and for members of that group are stored. The software is executed at least once. Specified portions of the executing software and of the results of executing the software on each execution are selected. Computations are performed on the selected portions to obtain a collection of fingerprints. The collection of fingerprints are compared to the previously computed superfingerprint of at least one second software group and the superfingerprints of the members of the second software group to determine whether there is an approximate match with the group and at least one of the superfingerprints of the members of the group. The software is declared to be the same as a particular member of the second software group if an approximate match is found.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is a flowchart illustrating a method for forming superfingerprints for members of a group;

DETAILED DESCRIPTION OF THE INVENTION

A description of preferred embodiments of the invention follows.

Figure 1:
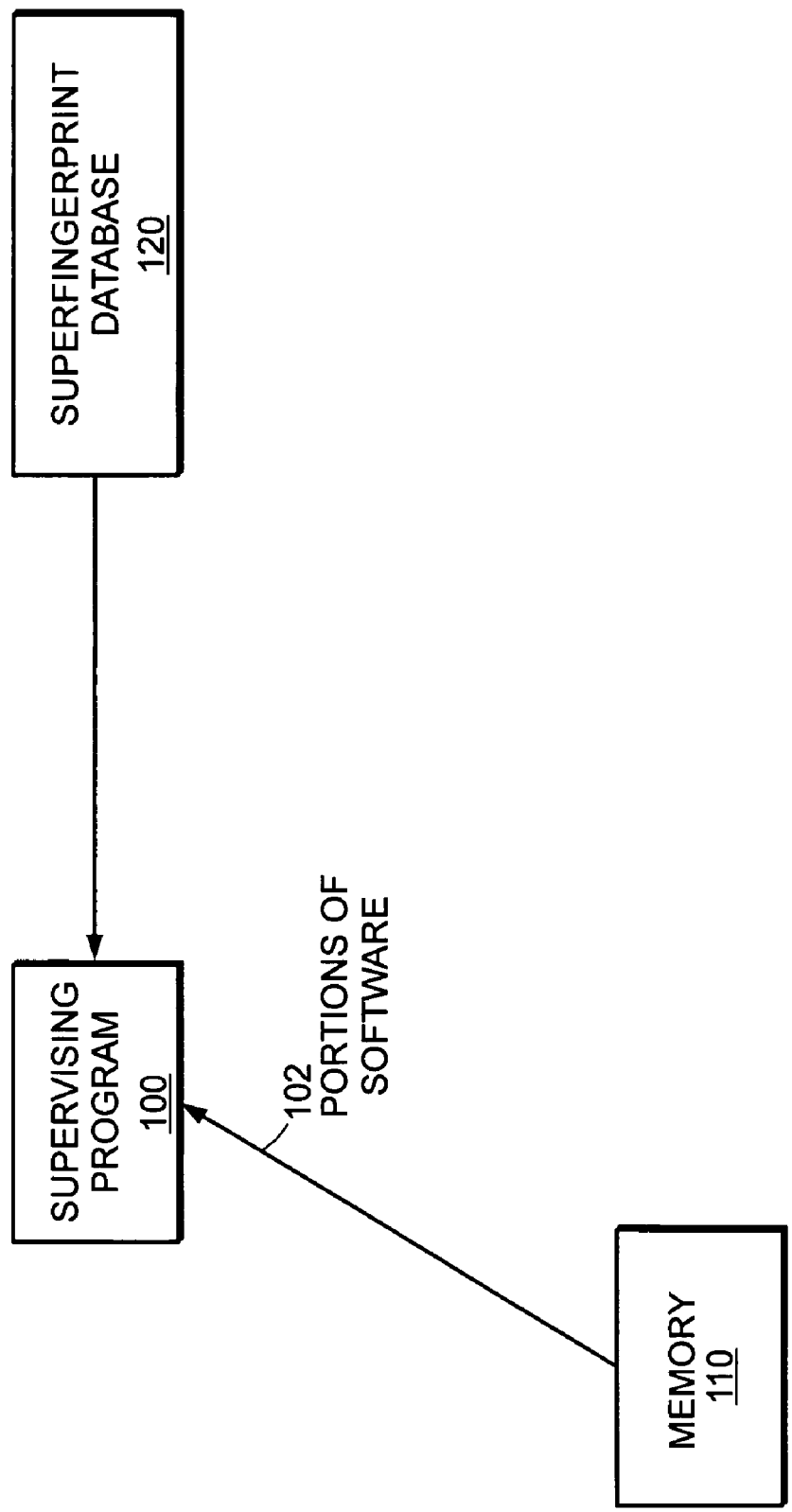
FIG. 1 is a block diagram of the components employed for identification of software at the time of execution according to the principles of the present invention.

FIG. 1 is a block diagram of the components employed for identification of software at the time of execution according to the principles of the present invention. Portions of Software and of the result of executing Software are read from the Memory 110 where Software is executing. The Supervising Program 100 computes fingerprints from these portions and compares those with the fingerprints it obtains from the Superfingerprint database 120. All three of these components (software, supervising program and superfingerprint database) may execute on the same device or each component may execute on a different device. The Memory 110 may be solid state, flash memory or any other form of storage storing portions of the Software to be identified (not shown) or portions of the results of executing that Software that are stored in Memory 110. The device (not shown) where Software is executing contains a computational device perhaps embodied as a microprocessor, but the Memory and the Superfingerprint database may each be on that device or on a different device.

Before further description of detailed embodiments of the invention are provided and explained, supporting definitions are provided below for some of the technical terms used by certain embodiments of the invention:

Software is construed to mean any digital content including but not limited to executable computer code as a library or not, Java applets, digitized music, digitized images and video, other form of visual display, or digitized text and data. Further the Software to be identified may be a subfunction of a larger Software, for example the spell checker of a word processor.

A group or family of software, sometimes called a Software Group, includes several distinct softwares, sometimes called members of the group, that are similar to one another. For example, different versions of Microsoft Word (or different versions of a business function such as spell-checker) may constitute a group. Different recordings of the same song by a single group may constitute a group.

Executing software is construed to mean any use of said software including but not limited to executing computer code, executing Java byte code by a Java Virtual Machine, playing digitized music on a digital player, creating a visual display, viewing a digital image by use of a digital viewer, playing a digitized video by use of a player, reading or modifying digitized text by a reader or an editing program, searching, mining or using digitized data in any manner including using said data as input to programs. Executing software also includes transmitting said software between devices, storing said software, or broadcasting said software. Finally, executing software in its broadest sense includes reading the software for identification purposes.

The result of executing software is the collection of digitized data produced by executing this software on a given, perhaps ongoing, input. Examples include, but are not limited to, the digitized images created by a game playing program when used; the binary code produced by a compiler program when applied to source code; the digitized stream of sound and images produced when playing a digitized movie; the digitized image representation produced by a graphics program in response to specified commands. Also included in the result of executing software are the data structures, buffers, system calls, control structures such as stacks, all representations in memory and in other storage of the digitized data, and the output stream created by executing the software.

A portion of a software is any subset, whether consecutive or not, and whether permuted or not (i.e., in order or in changed order), of the digital content comprising said software. For example, a portion of software may include operation codes (the instructions) but disregard addresses. A portion of an image may include edge information but disregard hue information or vice versa. A portion may also consist of an interaction between a user and executing software. For example, the portion may consist of key-stroke sequences that must be hit and that are characteristic of the Diablo game software. A portion of a result of executing software may be any subset, whether consecutive or not, and whether permuted or not, of the digital content comprising said result. For example, it may be a portion of an image produced by the software when it runs. In algorithms for creating superfingerprints and for identifying software, portions of a software may be used, portions of the result of executing said software may be used or at least one portion from each may be used.

Memory in the context of the present invention is any medium capable of storing Software or portions of Software or the result of executing software or portions of said result, including but not limited to registers, cache, random access memory, flash memory, disk, other forms of secondary memory, audio and video cards, other forms of output devices including visual displays, optical recordings, and tape.

A superfingerprint of a software is a collection of numbers, strings or symbols, possibly organized as one or more data structures, hereinafter collectively referred to as fingerprints, derived from said software. Each fingerprint may be the result of computations on specified portions of the digital content comprising the software, or a fingerprint may result from computations on digital content arising from executing specified portions of said software or both. Examples include but are not limited to computing a hash function value on a portion of a page of said software, computing the polynomial fingerprint of a portion of text, computing the statistics (average and variance) of the frequency of a portion of a sound file, computing Wavelet coefficients of a portion of a digital image produced by software, computing the Fourier coefficients of an audio track, the sequence of key stroke and click events of the execution of software, and so on.

In certain cases several sets of fingerprints are computed for a Software, perhaps arising from several executions of said software and possibly including examinations of files on disk. These sets can be combined in a variety of ways to form a superfingerprint for the software. One way is to intersect the sets. Another is to take those fingerprints that appear in more than a specified number of sets. The superfingerprint may then be reduced by excluding fingerprints associated with specified other softwares. If the superfingerprint is for a subfunction of a larger Software, the superfingerprint may consist of the set of fingerprints found when the larger Software executes that subfunction less the set of fingerprints found when the larger Software does not execute that subfunction. All these means of constructing superfingerprints are collectively called combining rules.

An approximate match between two collections of fingerprints, is an agreement exceeding a specified threshold number or a specified set of threshold numbers between specified fingerprints of one collection of fingerprints and specified fingerprints of the other collection of fingerprints. An example is that more than a certain fraction of the fingerprints in the two collections must agree. The agreement between one pair of fingerprints may be deemed more important than the agreement between another pair, as expressed in a higher weight for the more important agreement. The agreement between individual fingerprints employed in testing for the above approximate match, may itself be an approximate agreement. For example, in comparing two fingerprints which are numerical vectors, we may declare that they agree if the distance between said vectors is smaller than a specified threshold. Alternatively, we can assign a coefficient of agreement between two fingerprints depending on how similar they are. A single specified fingerprint of one collection may be compared with several fingerprints of another collection. For example, "dynamic time warping" may be used to match different pieces of music whose speed has been changed and for which a single note in one piece of music lasts longer than the corresponding note in the other piece of music. In that case, the short audio signal corresponding to one note in one piece of music may be compared to several audio signals in the other piece of music.

Figure 2:
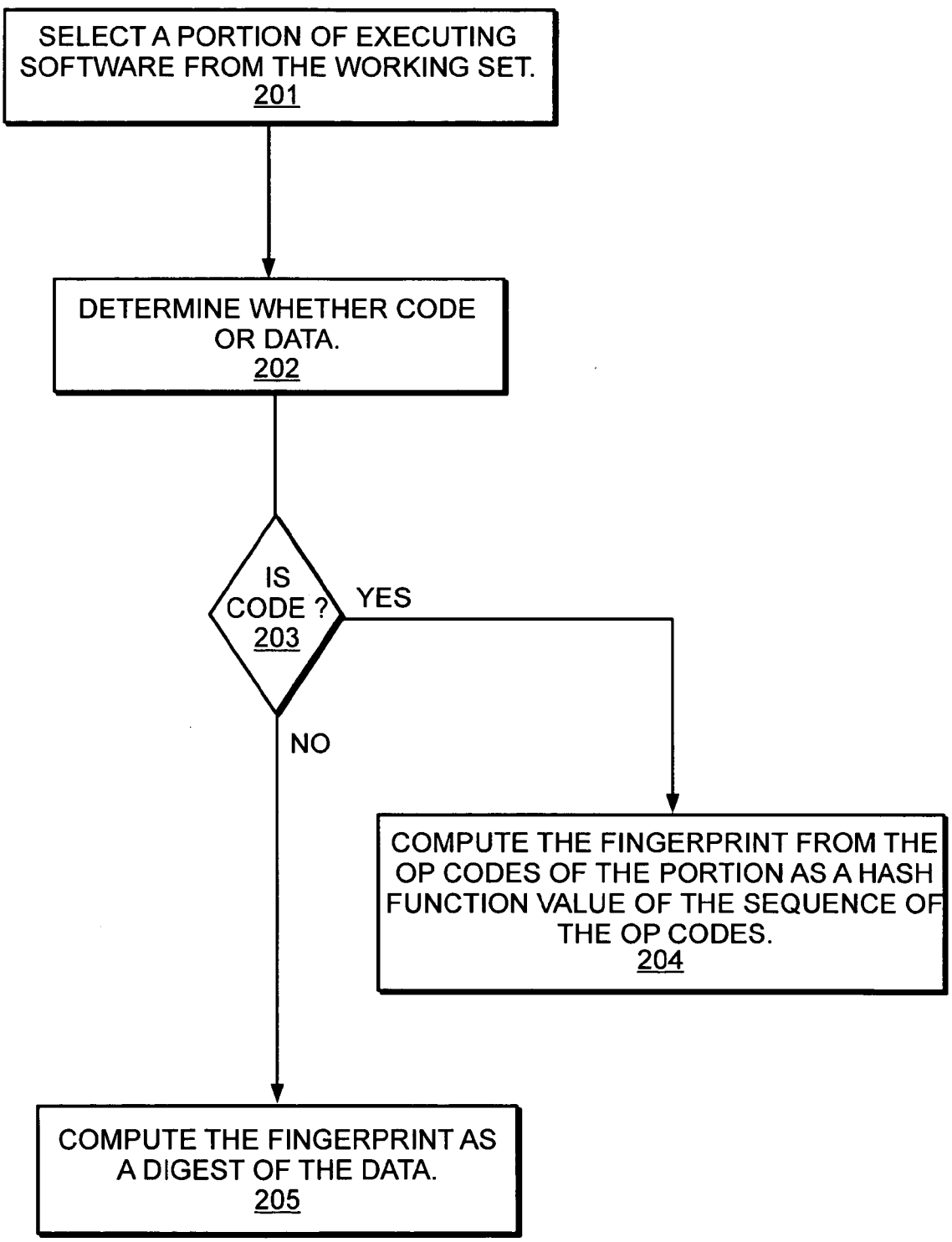
FIG. 2 is a flowchart illustrating a realization of part of the Supervising Program shown in FIG. 1.

Returning now to a discussion of the Figures, FIG. 2 is a flowchart illustrating a realization of part of the Supervising program 100 shown in FIG. 1. At step 201, the supervising program selects a portion of executing software from the working set for that software. The working set includes but is not limited to those portions of the software that have been recently accessed and possibly executed. The working set also includes but is not limited to portions of data that have been read or created by the software and portions of the result of executing said software. An example of a data working set is a portion of music or video or other visual display. At step 202, the supervising program checks whether the selected portion contains program instructions (code) or data. (The selected portion may contain one or both.) This can be performed by a variety of methods having to do with operation code frequency and the address range of operands. If at step 203, the selected portion includes, or is believed to include, program instructions, then at step 204, the supervising program computes a fingerprint from the operation code portion only of the program instructions. An empirically good choice of a portion of program instructions consists of at least one "basic block" which is a set of instructions appearing between two branching or looping conditions. A fingerprint is then a hash function value of the sequence of the operation codes. If at step 203, the selected portion is not program instructions, then at step 205, the supervising program computes a fingerprint as a digest of the data.

Many variations of this scheme are possible. First, the portion may come from the entire image of executing software rather than just the working set. It may also be partly or entirely on disk or other memory and be ready to be executed. Second, when the portion of interest is something other than program instructions; it can have many meanings. For example, it may be the audio signal of a Digital Video Disk ("DVD"), a single or moving image, or interpreted data such as a JAVA byte code. The portion may also be the result of executing the software as in the interaction between a user and a Software. For a data working set, an empirically good choice of a fingerprint is a digest of the data, which is a short description of the data that characterizes its most important properties. For music, this may include a sequence of short window Fourier transforms. Each Fourier transform captures the frequencies (or, equivalently, the pitches) of the music during a short period of time. For an image, the digest may include a sequence of numbers representing the amount of each hue in the image. This amount may be discretized to reduce the effect of noise. Thus a fingerprint may be a sequence of instructions, data, digests, keystrokes to name some examples. The type of sequence chosen depends on the application. Third, the fingerprint may treat the data as an unordered collection or a partially ordered collection rather than as a sequence. That is, the two sequences ABC and BAC may result in the same fingerprint. Finally, the fingerprint need not be a hash function value but may be the value result of any function.

Figure 3:
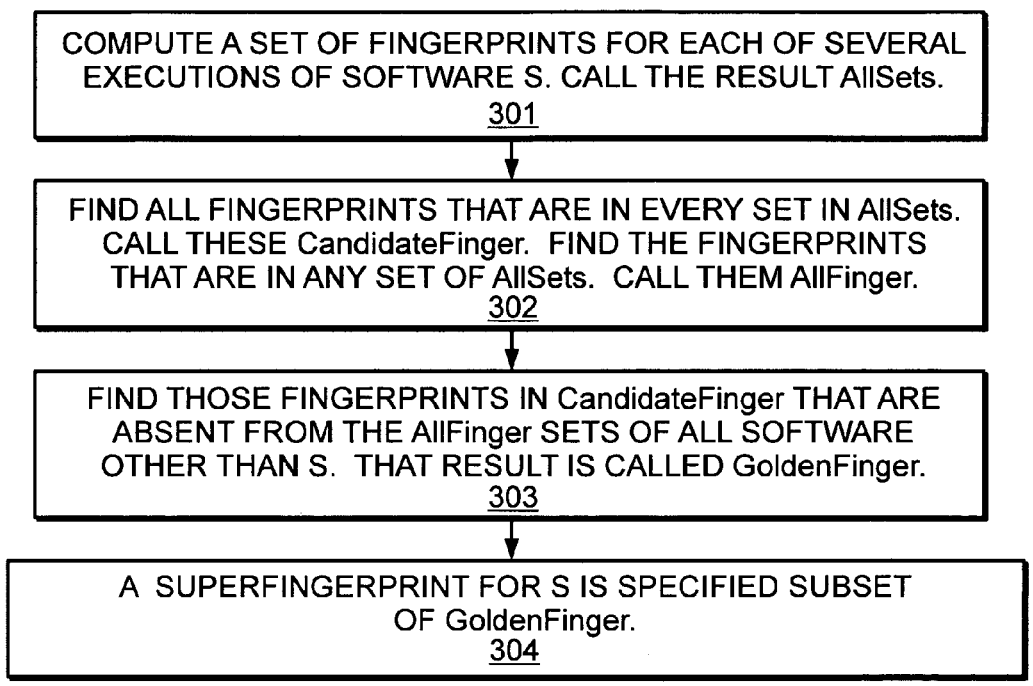
FIG. 3 is a flowchart illustrating a method for creating a superfingerprint.

FIG. 3 is a flowchart illustrating a method for creating a superfingerprint for some software S in order to form the Superfingerprint database 120 shown in FIG. 1. At step 301, one set (or, equivalently, collection) of fingerprints is computed for each execution of S. The set consisting of all these sets is called AllSets. Some fingerprints may appear in every set of AllSets; others in only a few. At step 302, a fingerprint that appears in every set of AllSets is put into CandidateFinger. A fingerprint that occurs in at least one set of AllSets is put into Allfinger. Naturally, CandidateFinger is a subset of AllFinger. At step 303, those fingerprints in CandidateFinger that are not found in the AllFinger set of any software other than S are put into GoldenFinger. The Superfingerprint is some specified subset of GoldenFinger. The subset may be specified in several ways. For example, the subset may be of some minimum size and may be chosen at random from GoldenFinger without replacement. As another example, the subset may be chosen to comprise fingerprints of some specified portions of the software. One possible specification rule is that the fingerprints should come from pages or other localized region of the software that have more than a specified number of members of GoldenFinger. A page is a quantity of logically contiguous memory usually numbering in the thousands of bytes or more that is the unit of access when moving data from secondary memory to primary memory. Contiguity may be an important feature for the purposes of the present invention because if two collections (or sets) of fingerprints match and each comes from one page, then a large portion of those pages are likely to be the same.

Many variations of this scheme are possible. For example, the criterion for inclusion in CandidateFinger may be less stringent—perhaps appearance in more than a threshold number of the sets in AllSets is sufficient. Similarly, the criterion for being a GoldenFinger may be less stringent. It may be acceptable for the fingerprint to occur in only fewer than a specified number of Allfingers of other specified Softwares. That is, a fingerprint may be shared among the GoldenFingers of several Softwares.

Figure 4:
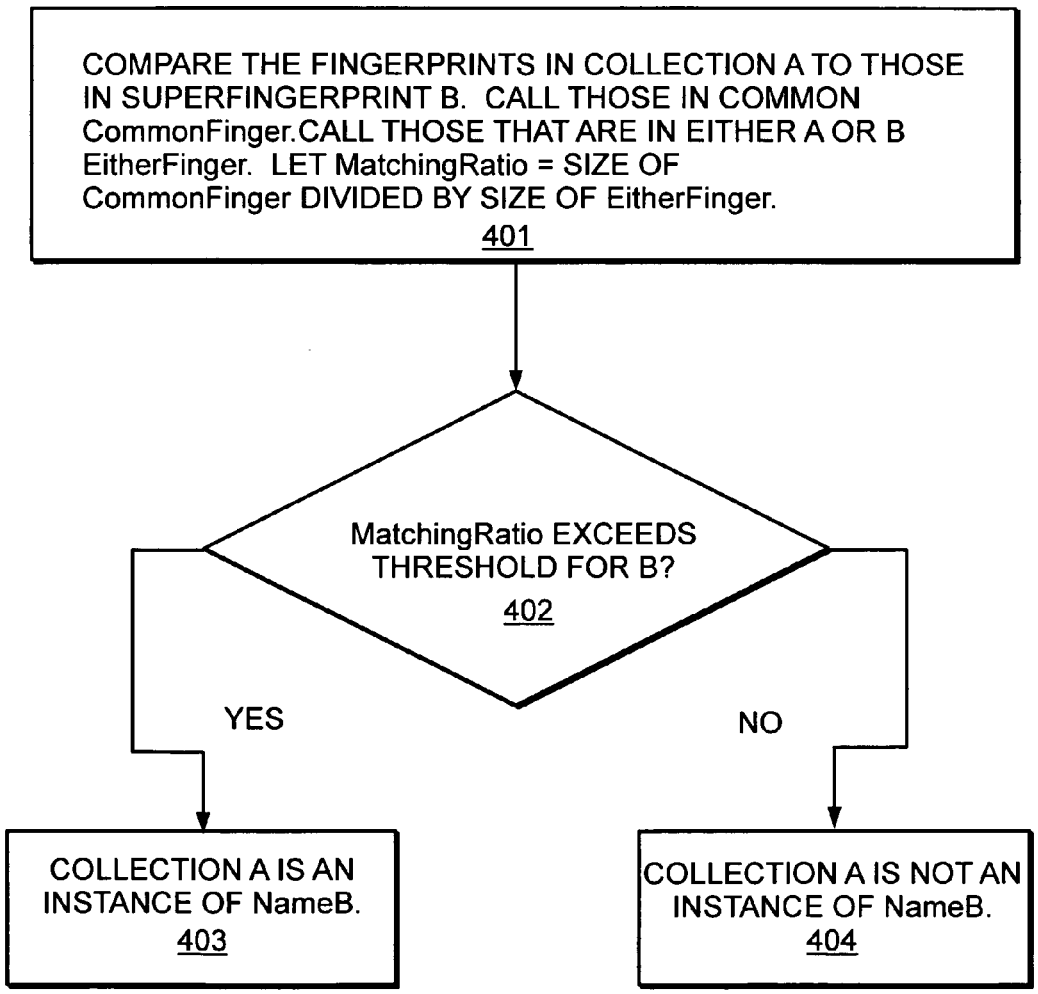
FIG. 4 is a flowchart illustrating a method for comparing two sets of fingerprints.

FIG. 4 is a flowchart illustrating a method for comparing a set of fingerprints A computed and collected during at least one execution of some Software SU with another set that may come from a Superfingerprint B, using approximate matching.

In one embodiment, the comparison of the fingerprints is performed for the purpose of deciding whether the Software SU can be identified as the Software with name NameB, or belonging to the Group Software with name NameB that has given rise to the Superfingerprint B. The Superfingerprint B may come from the Superfingerprint Database 120 shown in FIG. 1. At step 401, the fingerprints in collection A are compared to those in superfingerprint B. The fingerprints in common between sets A and B are called CommonFinger. The fingerprints in either set (collection) are called EitherFinger. The MatchingRatio is given by the equation:

MatchingRatio=|CommonFinger|/|EitherFinger|, where |CommonFinger| is the number of elements in CommonFinger and |EitherFinger| is the number of elements in EitherFinger.

At step 402, if the MatchingRatio exceeds a threshold that may be specific to Superfingerprint B, then at step 403, set A is identified as an instance of NameB. If not, at step 404, set B is not identified as an instance of NameB.

Many variations of this scheme are possible. First the set of fingerprints A may result from executing the Software SU several times and may be the result of collecting all the fingerprints in those executions. Alternatively, the fingerprints collected from later executions may be constrained by those found in at least one earlier execution. This might be important if it is expensive to collect fingerprints from an entire execution image or if the fingerprints from certain portions of the execution image are already known or if an earlier approximate match had suggested that Software SU may match at least one particular stored Software in which case the later fingerprints would be taken only from certain portions of storage. The fingerprints may come from portions of the Software SU stored anywhere in memory including on primary and secondary storage. The portions themselves may be specifically associated with some function, e.g. the spell-checking portion. The fingerprints may also come from the Software SU as it is being sent from one device to another, e.g. when a video stream is downloaded or when an audio stream is sent from a processor to an output device. Finally, the fingerprints may come from the result of executing the Software SU, for example, from digitized images or sounds generated by the Software SU. Second, instead of simply counting the number of elements in CommonFinger and EitherFinger, the fingerprint agreements can have weights and the ratio is based on the sum of the weights. For example, if a fingerprint in CommonFinger occurs in very few Softwares, it may have more weight than if it occurs in many Softwares. As another example, if the relative virtual memory locations of two or more fingerprints in A are the same as those of the corresponding fingerprints in B, that fact may be given additional weight. Also, the decision to identify the Software SU with name NameB may depend not only on the MatchingRatio and a threshold associated with Superfingerprint B, but also on the MatchingRatio between the fingerprints A and other Superfingerprints. For example, it may be necessary for the MatchingRatio to be significantly higher with respect to B than with any other Superfingerprint C in order to conclude that the Software SU having fingerprints A should be identified as NameB. Third, the MatchingRatio itself may be defined to be |CommonFinger|/|Fingerprints A| if for example the size of Fingerprints A is small. Alternatively the MatchingRatio may be defined to be |CommonFinger|/|Superfingerprint B|.

Figure 5:
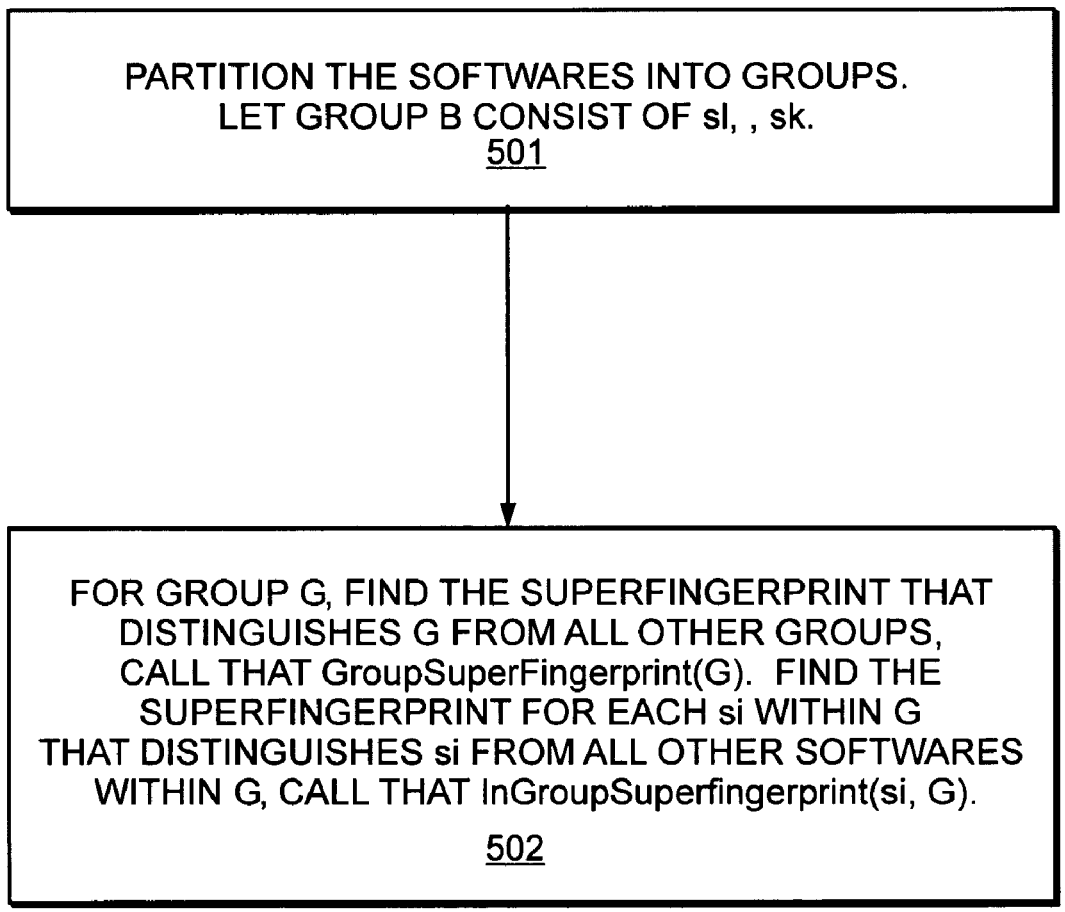
FIG. 5 is a flowchart illustrating a method for creating superfingerprints for software groups.

FIG. 5 is a flowchart illustrating a method for creating superfingerprints for software groups. Widely used Software usually comes in many versions and patches. In normal usage, a patch to Software S changes a localized portion of S in order to create a new software S'. A new version may effect pervasive changes to S, but the result S' will often remain similar to S. This occurs for computer programs, for dynamically linked libraries, and even for movies. For applications that require that a precise version and patch be identified, it is useful to consider related versions and patches to constitute a Software Group. At step 501, the softwares are partitioned into groups with software group G including software sl, sk. Because the members of a Software Group are similar to one another, each member may have just a few fingerprints that are unique to it. For this reason, in one embodiment of this invention, at step 502, we characterize each Software Group by a GroupSuperfingerprint and each member of the group by an InGroupSuperfingerprint. The GroupSuperfingerprint(G) for group G has fingerprints that characterize the group as a whole, whereas for a Software S within the Software Group G InGroupSuperfingerprint(S,G) is computed from portions of S which are unique to the Software S and are in the GroupSuperfingerprint(G).

FIG. 6 is a flowchart illustrating a method for forming superfingerprints for members (individuals) of a group. The method includes forming InGroupSuperfingerprint for each member of the group from InGroupGolden. The idea is to compute those fingerprints as if the entire universe of Software were those in the group. Group G includes softwares Sl, Sk. At step 601, the CandidateFinger, AllSets, and Allfinger of each individual Software Si within Group G is computed as described earlier in conjunction with FIG. 3. At step 603, the fingerprints from CandidateFinger(si) that are in no other Softwares of Group G are put into InGroupGoldenFinger(Si, G). At step 604, the InGroupSuperfingerprint (Si, G) is a subset of InGroupGoldenFinger(si, G) and can be accessed from InGroupSuperfingerprint(Si, G). The variations pertaining to FIG. 3 also pertain here with the additional variation that particularly interesting fingerprints for InGroupGoldenFinger(Si,G) are those that are absent from Allfinger(S) for any software S, whether it is in the software group G or not.

Figure 7:
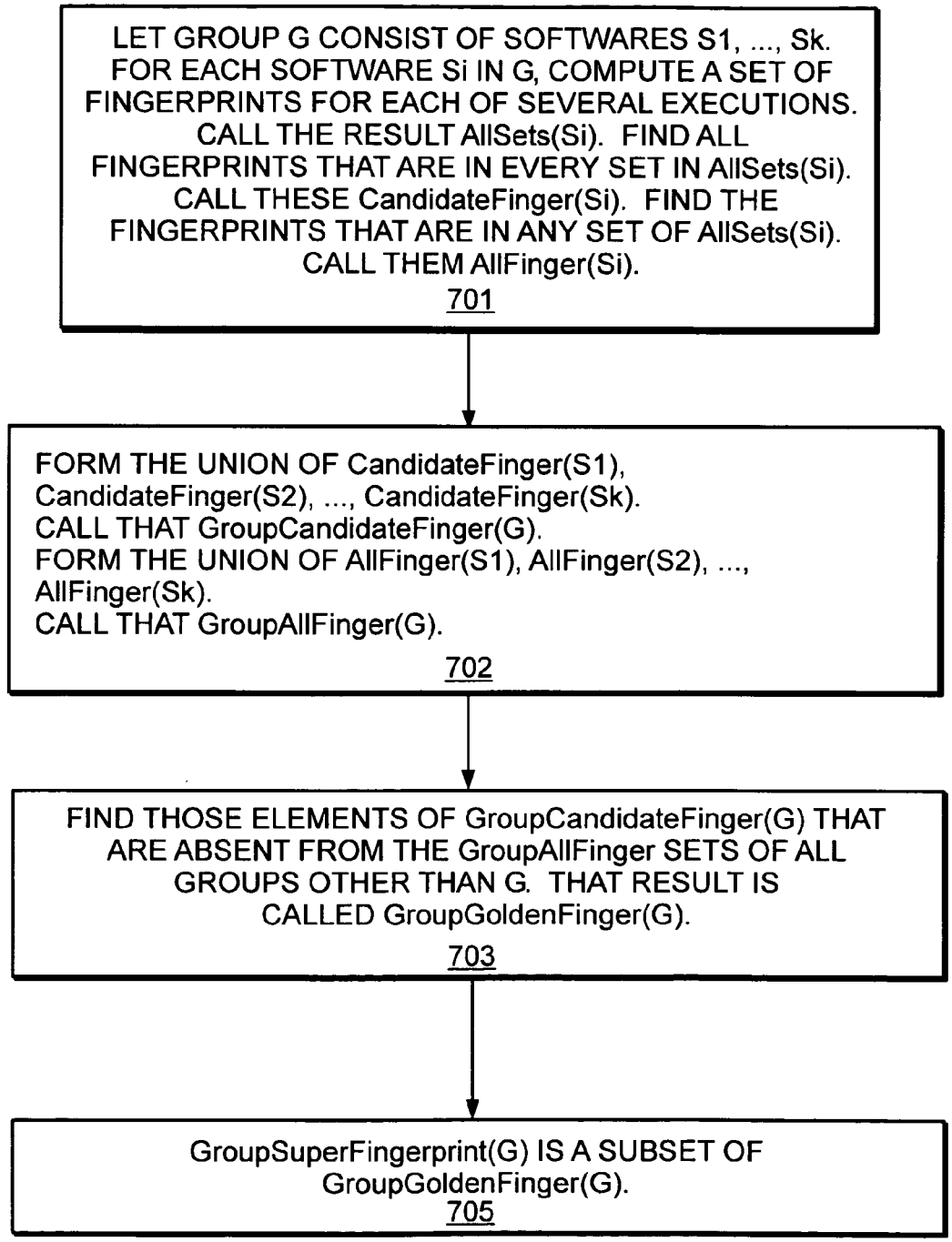
FIG. 7 is a flowchart illustrating a method for forming a superfingerprint for an entire group.

FIG. 7 is a flowchart illustrating a method for forming a superfingerprint for an entire group. The method includes finding GroupGoldenFinger from which GroupSuperfingerprint will be formed. At Step 701, AllSets(Si), CandidateFinger(Si), and Allfinger(Si) are formed for each Software Si in Group G, as described in conjunction with step 601. At Step 702, the set union of the CandidateFinger sets for all members of the Software Group G are found, yielding GroupCandidateFinger(G). Also the union of the AllFinger sets of every member of the group are formed yielding GroupAllFinger(G). At Step 703, the elements in GroupCandidateFinger(G) that are absent from the GroupAllFinger sets of all groups other than G are found. The result is called GroupGoldenFinger(G). At step 705, GroupSuperfingerprint(G) is a specified subset of GroupGoldenFinger(G). As described earlier in conjunction with step 303, the subset may be specified in many ways.

Figure 8:
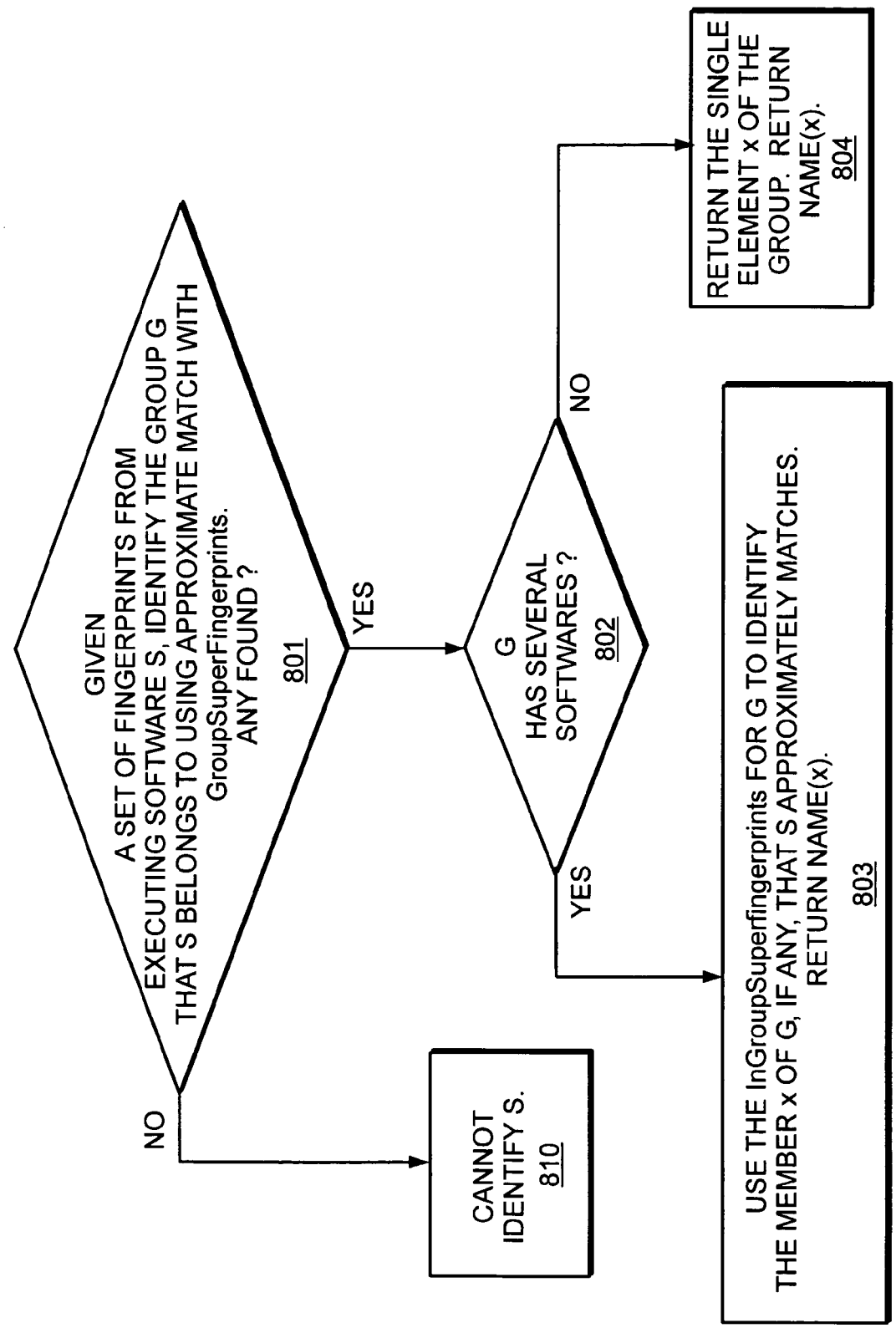
FIG. 8 is a flowchart illustrating a method for identifying software that is part of a group in two stages.

FIG. 8 is a flowchart illustrating a method for identifying a software S that is part of a group in two stages. At step 801, in the first stage, the software is matched by using approximate matching of a set of fingerprints from the executing software S to at least one GroupSuperfingerprint to identify the Group G to which software S belongs. If at step 802, in the second stage, a match is found and the GroupSuperfingerprint is associated with several Softwares that is, has more than one element then, at step 803, the InGroupSuperfingerprints for G is used to identify the member of Group G to which Software S is most similar. If the group has only one element, then at step 804, the name of that element is returned as the identification of S. If no matches are found, at step 810, software S cannot be identified.

Figure 9:
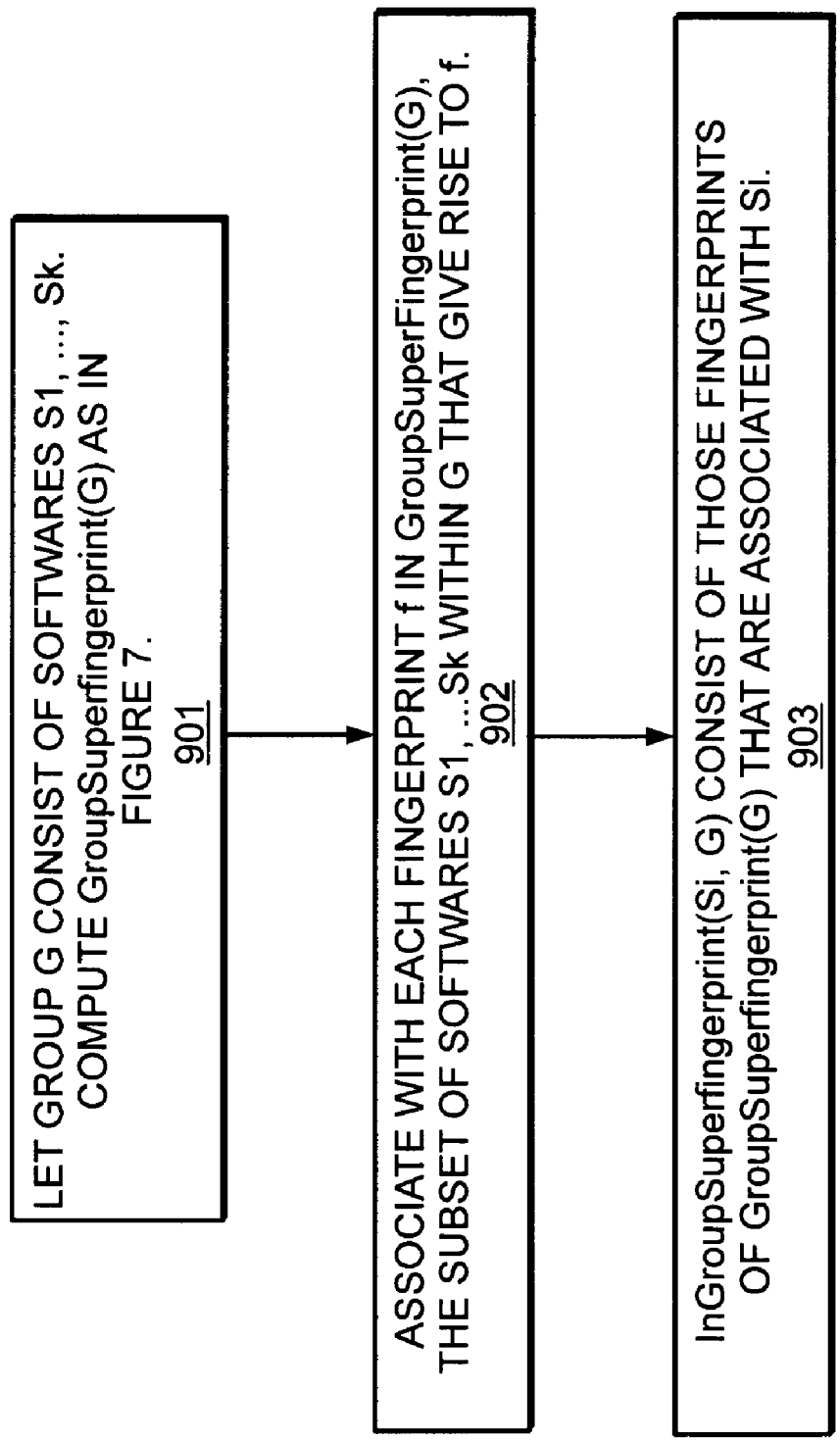
FIG. 9 is a flowchart illustrating another method for forming a superfingerprint for an entire group and superfingerprints for individuals of a group.

FIG. 9 is a flowchart illustrating another method for forming a superfingerprint for an entire group and superfingerprints for individuals of a group. In contrast to the embodiment described in conjunction with FIG. 6, for Superfingerprints for Software Groups in which InGroupSuperfingerprints(Si, G) may include fingerprints that do not belong to GroupSuperfingerprint(G), in this embodiment, InGroupGoldenFinger(Si, G) for some member Si of G is a subset of GroupSuperfingerprint(G). At step 901, the GroupSuperfingerprint(G) is constructed as described in conjunction with steps 701-705 (FIG. 7). At step 902, each fingerprint f in GroupSuperfingerprint(G) is associated with the subset of Sl, . . . , Sk that contain f. For example, if the group contains five members S1, S2, S3, S4, and S5 and f is present in S2, S3, and S4, then associate S2, S3, and S4 with f. Similarly, if g is present in S1 and S4 alone, then associate S1 and S4 with g. At step 903, InGroupSuperfingerprint(si, G) is defined to be the fingerprints that are associated with Si. Using this alternate embodiment does not change the identification algorithm described in conjunction with FIG. 8.

One way to implement this information is to create a single array of length k that lists the names of the members and then to associate with each fingerprint f, a bit vector, indicating which Softwares of the array contain f. Thus a 1 in position m of the vector associated with f indicates that f is present is the mth member of the array. In the example with five members, the array contains S1, S2, S3, S4, and S5 and the bit vector for f is 0 1 1 1 0 whereas the bit vector for g is 1 0 0 1 0.

Because of the nature of software, it is unlikely that an early version may contain a fingerprint f, a later version would not contain f, yet a still later version would contain f again, though we allow this possibility for g in the example above. So, an alternate implementation is to associate with each fingerprint the index of the first member containing that fingerprint, say k1, and the index of the last member containing that fingerprint, say k2. In the example of five members, only f could use this representation and k1=2 and k2=4.

Figures 10, 11:
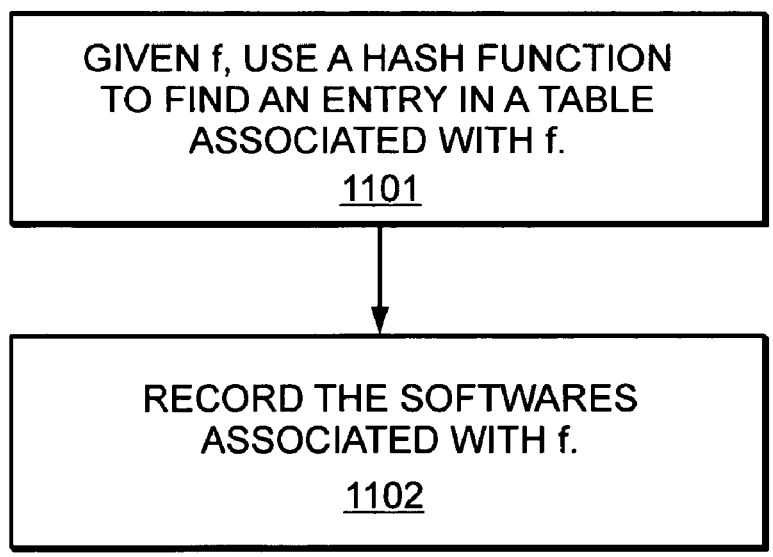
FIG. 10 is a data structure for the rapid access of fingerprints within superfingerprints.
FIG. 11 is a flowchart illustrating a method for finding entries in the data structure shown in FIG. 10.

FIG. 10 shows a data structure 1002 for the rapid access of fingerprints within Superfingerprints. The data structure (table) 1002 has a plurality of entries with each entry storing a fingerprint with associated softwares. For example, in the first entry 1004, fingerprint f1 is associated with software A, in the second entry 1006, fingerprint f2 is associated with software B and software C and in the second entry fingerprint f3 is associated with software A and software B.

FIG. 11 is a flowchart illustrating an access method for finding entries in the table shown in FIG. 10. At step 1101, an access method such as hashing is used that takes a fingerprint as an argument and finds the entry in a table such as the sample table of 1002 to see which Softwares that fingerprint matches Hashing methods are well-known to those skilled in the art. At step 1102, the softwares associated with f stored in the selected entry are recorded. Using this method, the lookup of the Softwares associated with each fingerprint requires only constant time.

It will be apparent to those of ordinary skill in the art, that methods involved in the present invention may be embodied While this invention has been particularly shown and described with references to preferred embodiments thereof, it will be understood by those skilled in the art that various changes in form and details may be made therein without departing from the scope of the invention encompassed by the appended claims.

What is claimed is:

1. A method for creating a superfingerprint for identifying a protected software comprising:
   creating a superfingerprint for said protected software by:
   executing said protected software at least once;
   in each execution, using a supervising program, selecting specified portions of the executing image of at least one of said executing software and of results of executing said protected software;
   in each execution, using a supervising program, performing computations on said selected portions to obtain a collection of fingerprints; and
   combining, using the supervising program, said collections of fingerprints found in each execution into the superfingerprint of said protected software according to a combining rule;
   at a later time, detecting execution of an unidentified software; and using the superfingerprint of the protected software to identify the executing unidentified software, where the executing unidentified software is identified as the protected software using the superfingerprint even if the executing unidentified software and the protected software are not exactly the same by:
      selecting by a supervising program specified portions of the executing image of at least one of said executing unidentified software and of the results of executing said executing unidentified first software on each execution;
      performing by said supervising program specified computations on said selected portions to obtain a collection of fingerprints from the executing unidentified software;
      comparing said collection of fingerprints from the executing unidentified software to a previously computed superfingerprint of the protected software to determine whether there is an approximate match; and
      declaring said the executing unidentified software to be the same as said the protected software if an approximate match is found.

2. The method of claim 1 wherein the protected software is executed a plurality of times in order to form the superfingerprint and the collection of fingerprints obtained during each execution are combined together according to the combining rule.

3. The method of claim 2 wherein the combining rule outputs only those fingerprints that are computed in more than a specified number of executions.

4. The method of claim 1 wherein the combining rule used to form the superfingerprint removes from the output those fingerprints that occur in more than a specified number of executions of specified other protected softwares.

5. The method of claim 4 wherein fingerprints are not removed if they belong to a same group of protected software as said protected software.

6. The method of claim 1 wherein a fingerprint belongs to the superfingerprints of several protected softwares.

7. The method of claim 6 further comprising:
   storing in at least one data structure at least one fingerprint and means to identify said several protected softwares in whose superfingerprint said fingerprint is included.

8. The method of claim 7 wherein the means to identify is a bit vector data structure whose mth bit indicates whether the superfingerprint associated with the mth member of said several protected softwares includes said fingerprint.

9. The method of claim 7 wherein associated with each said fingerprint there are at least two numbers k1 and k2 where k2 is greater than or equal to k1 that indicate that the superfingerprints of protected softwares from k1 to k2 of said several protected softwares all include said fingerprint.

10. The method of claim 6 wherein said several protected softwares belong to a group of protected software.

11. The method of claim 1 wherein the fingerprints of various protected softwares are stored in a data structure to facilitate and accelerate retrieval of fingerprints and associated names of protected software.

12. The method of claim 1 wherein the executing protected software is partitioned into pages, said specified portions are selected from said pages and the computations produce a fingerprint for each portion.

13. The method of claim 1 wherein said specified portions are selected from the protected software stored in a memory of the device executing said protected software.

14. The method of claim 1 wherein said specified portions are selected from the protected software stored in secondary memory of the device executing said protected software.

15. The method of claim 1 wherein the specified portions are basic blocks of programs.

16. The method of claim 1 wherein the computation involves only parts of said selected portions.

17. The method of claim 16 wherein said involved parts are operation codes.

18. The method of claim 16 wherein said involved parts are information in an audio signal.

19. The method of claim 16 wherein said involved parts are information in a visual display.

20. The method of claim 1 wherein the selected portion concerns the interaction between at least one user and the execution of protected software.

21. The method of claim 1 wherein the input to the computation is a sequence.

22. The method of claim 1 wherein the computation is a hash function value of said portion.

23. The method of claim 22 wherein the hash function value is computed by polynomial fingerprinting.

24. The method of claim 1 wherein the computation is a computation on an audio signal.

25. The method of claim 1 wherein the computation is a computation on a video stream.

26. A method for identifying a first protected software comprising the steps of:
   storing previously created superfingerprints for at least one protected software;
   detecting execution of an unidentified software; and
   using the superfingerprints of the protected software to identify the executing unidentified software, where the executing unidentified software is identified as the protected software using the superfingerprint even if the executing unidentified software and the protected software are not exactly the same by:
      selecting by a supervising program specified portions of the executing image of at least one of said executing unidentified software and of the results of executing said executing unidentified software on each execution;

performing by said supervising program specified computations on said selected portions to obtain a collection of fingerprints from the executing unidentified software;

comparing said collection of fingerprints from the executing unidentified software to said previously computed superfingerprint of the protected software to determine whether there is an approximate match; and declaring said the executing unidentified software to be the same as said the protected software if an approximate match is found.

27. The method of claim 26 wherein said specified portions of said executing protected software and of said results of executing said software, are stored in a memory of a device executing said protected software.

28. The method of claim 27 wherein said specified portions of at least one of said executing protected software and of said results of executing said protected software, are selected from recently accessed portions of the protected software stored in the memory of the device executing said protected first software.

29. The method of claim 27 wherein said specified components of said executing protected software are selected from portions of said executing protected software stored in secondary storage.

30. The method of claim 26 wherein the portions of said executing protected software are selected while said protected software is sent from one device to another.

31. The method of claim 26 wherein said portions of the results of execution of said protected software are selected from the output of the device executing said protected software.

32. The method of claim 26 wherein said specified portions of at least one of said executing protected software and of the results of executing said protected software on a later execution are dependent on the results of an earlier approximate match.

33. The method of claim 26 wherein determining the approximate match comprises:

determining whether the amount of said commonality between said fingerprints of said first protected software and the fingerprints comprising said superfingerprint of said at least one second protected software exceeds a specified threshold in which case the first protected software is identified to be the same as the second protected software.

34. The method of claim 33 wherein said specified threshold is exceeded only if the amount of commonality between said fingerprints of said first protected software and the fingerprints comprising said superfingerprint of said second protected software exceed the commonality between said fingerprints of said first protected software and the fingerprints comprising the superfingerprint of a third protected software.

35. The method of claim 33 wherein the commonality between the fingerprints of said first protected software and said second protected software depends on the number of fingerprints that are the same in said two protected softwares with a weighting factor for each equal fingerprint.

36. The method of claim 35 wherein commonality further depends on the number of fingerprints that are different in said two protected softwares with a weighting factor for each unequal fingerprint.

37. The method of claim 35 wherein commonality further depends on the relative positions of the portions of protected software from which at least two fingerprints are computed.

38. The method of claim 26 wherein the specified computation involves only parts of said selected portions.

39. The method of claim 38 wherein said involved parts are operation codes.

40. The method of claim 38 wherein said involved parts are information in an audio signal.

41. The method of claim 38 wherein said involved parts are information in a visual display.

42. The method of claim 26 wherein the selected portion concerns the interaction between at least one user and the execution of protected software.

43. The method of claim 26 wherein the input to the computation is a sequence.

44. The method of claim 26 wherein the input to the comparison is a collection of fingerprints each having an associated weight.

45. The method of claim 26 wherein the computation is a hash function value of said portion.

46. The method of claim 45 wherein the hash function value is computed by polynomial fingerprinting.

47. The method of claim 26 wherein the computation is a computation on an audio signal.

48. The method of claim 26 wherein the computation is a computation on a video stream.

49. A method for identifying a protected software group of a first protected software comprising the steps of:

storing previously created superfingerprints for at least one protected software group;

detecting execution of an unidentified software; and using one of the superfingerprints of the protected software to identify the executing unidentified software, where the executing unidentified software is identified as the protected software using the superfingerprint even if the executing unidentified software and the protected software are not exactly the same by:

selecting specified portions of the executing image of said executing unidentified software and of the results of executing said executing unidentified software on each execution;

performing specified computations on said selected portions to obtain a collection of fingerprints from the executing unidentified software;

comparing said collection of fingerprints to said previously computed superfingerprint of at least one second protected software group to determine whether there is an approximate match; and declaring said executing unidentified software to be a member of said second protected software group if an approximate match is found.

50. A method for identifying a protected software that is a member of a group of protected software comprising the steps of:

storing previously created superfingerprints for at least one protected software group and for members of that group;

detecting execution of an unidentified software; and using one of the superfingerprints of the protected software to identify the executing unidentified software, where the executing unidentified software is identified as the protected software using the superfingerprint even if the executing unidentified software and the protected software are not exactly the same by:

selecting specified portions of the executing image of said executing unidentified software and of the results of executing said executing unidentified software on each execution;

performing computations on said selected portions to obtain a collection of fingerprints from the executing unidentified software;

comparing said collection of fingerprints from the executing unidentified software to said previously computed superfingerprint of at least one protected software group and the superfingerprints of the members of said protected software group to determine whether there is an approximate match with said group and at least one of said superfingerprints of said members of said group; and declaring said executing unidentified software to be the same as a particular member of said second protected software group if an approximate match is found.

* * * * *